United States Patent [19]

Ivey et al.

[11] Patent Number: 5,009,631
[45] Date of Patent: Apr. 23, 1991

[54] CVT CHAIN-BELT

[75] Inventors: John S. Ivey, Ithaca; Paul M. Bateman, Freeville; Julius A. Clauss; Edward H. Cole, Jr., both of Ithaca; Philip J. Mott, Dryden, all of N.Y.

[73] Assignee: Borg-Warner Automotive, Inc., Troy, Mich.

[21] Appl. No.: 416,704

[22] Filed: Oct. 3, 1989

Related U.S. Application Data

[62] Division of Ser. No. 356,617, May 23, 1989, which is a continuation of Ser. No. 114,335, Oct. 28, 1987, abandoned.

[51] Int. Cl.$^5$ ............................................. F16G 13/02
[52] U.S. Cl. .................................... 474/213; 474/245
[58] Field of Search ............................. 474/212–217, 474/242, 245, 201

[56] References Cited

U.S. PATENT DOCUMENTS

| 1,561,676 | 11/1925 | Wertman | 474/214 X |
|---|---|---|---|
| 1,563,065 | 11/1925 | Belcher | 474/214 X |
| 1,734,688 | 11/1929 | Morse | 474/214 X |
| 2,047,833 | 7/1936 | Pierce | 474/214 X |
| 2,067,243 | 1/1937 | Perry | 474/214 X |
| 2,096,061 | 10/1937 | Perry | 474/214 X |
| 2,223,314 | 11/1940 | Cumfer | 474/214 X |
| 2,324,640 | 7/1943 | Perry | 474/214 X |
| 2,651,211 | 9/1953 | Karig | 474/201 |
| 4,186,617 | 2/1980 | Avramidis et al. | 474/279 |
| 4,313,730 | 2/1982 | Cole, Jr. et al. | 474/201 |
| 4,386,921 | 6/1983 | Roberts | 474/201 |
| 4,386,922 | 6/1983 | Ivey | 474/242 |
| 4,392,843 | 7/1983 | Smit | 474/245 |
| 4,464,152 | 8/1984 | Kern | 474/245 |
| 4,498,892 | 2/1985 | Huntley | 474/242 |
| 4,507,106 | 3/1985 | Cole, Jr. | 474/245 X |
| 4,512,754 | 4/1985 | Cole, Jr. et al. | 474/245 |
| 4,516,963 | 5/1985 | Mott | 474/245 |
| 4,516,964 | 5/1985 | Laster | 474/245 |
| 4,516,965 | 5/1985 | Mott | 474/245 |
| 4,526,559 | 7/1985 | Smirl | 474/201 |
| 4,526,560 | 7/1985 | Swain | 474/242 |
| 4,547,182 | 10/1985 | Rattunde | 474/214 |
| 4,553,953 | 11/1985 | Bock | 474/201 |
| 4,569,671 | 2/1986 | Ledvina | 474/201 |
| 4,580,999 | 4/1986 | Ledford | 474/201 |
| 4,581,000 | 4/1986 | Ferfecki | 474/201 |
| 4,622,025 | 11/1986 | Kern et al. | 474/245 |
| 4,645,479 | 2/1987 | Bateman et al. | 474/242 |
| 4,650,445 | 3/1987 | Mott | 474/201 |
| 4,692,130 | 9/1987 | Novak | 474/201 |
| 4,708,701 | 11/1987 | Cole, Jr. | 474/245 |
| 4,718,880 | 1/1988 | Zimmer | 474/201 |
| 4,738,654 | 4/1988 | Cole, Jr. | 474/219 |
| 4,767,388 | 8/1988 | Tatara et al. | 474/245 |
| 4,795,409 | 1/1989 | Okuwaki et al. | 474/245 |

Primary Examiner—Thuy M. Bui
Attorney, Agent, or Firm—Neuman Williams; Greg Dziegielewski

[57] ABSTRACT

A chain-belt for engagement with the pulleys of a continuously variable transmission consists of interleaved sets of chain links joined for articulation by a joint which has a rocking action. The joint includes a pair of pins. A small camber is introduced into one or both of the pins to create a spring load between the pins and the links to retain the pins in the chain during handling and assembly. Each chain link includes a pair of spaced apertures adjacent the opposite ends; each aperture has a generally hour-glass shape with the enlarged ends receiving the pins. Also, each chain link has a pair of oppositely disposed tabs adjacent one end with the location of the tabs on the links alternating on adjacent links of each set. In addition the outermost two links of each set of links had a width substantially less than the width of the inner links in that same set.

3 Claims, 2 Drawing Sheets

FIG. 4
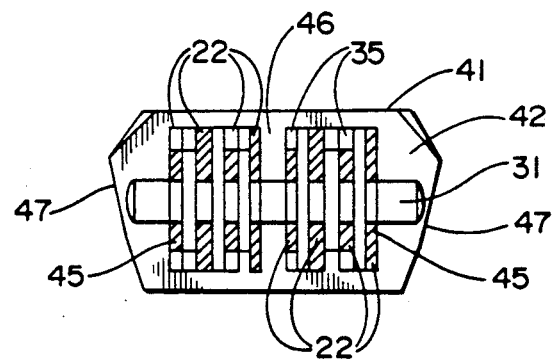
FIG. 5
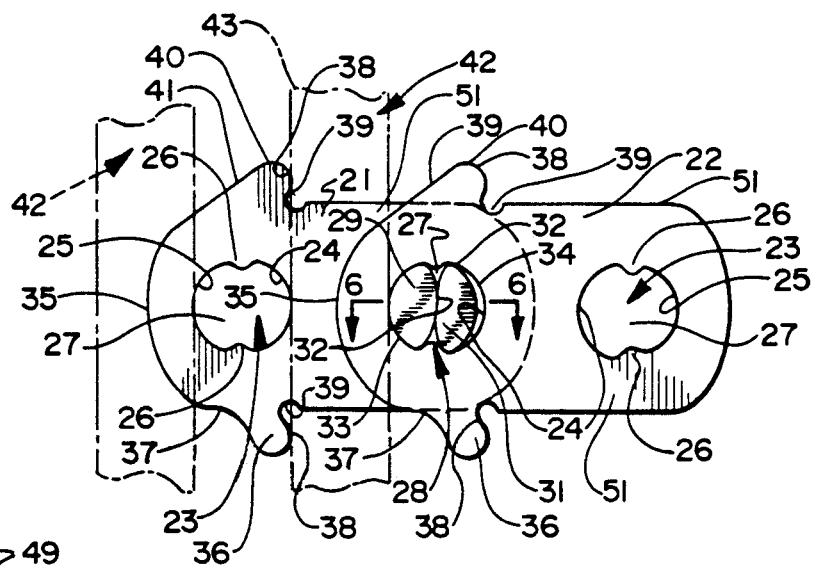
FIG. 6
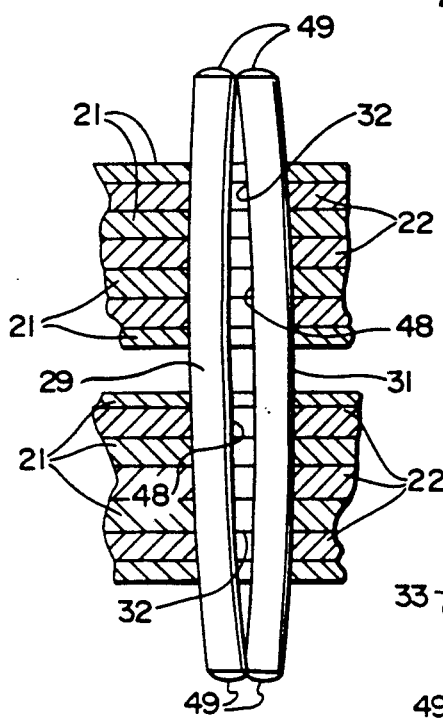
FIG. 7

CVT CHAIN-BELT

This is a division of application Ser. No. 356,617 filed May 23, 1989 which was a continuation of application Ser. No. 114,335, filed Oct. 28, 1987, now abandoned.

BACKGROUND OF THE INVENTION

The present invention relates to a chain belt, and more particularly to a pivot joint for articulation between adjacent sets of chain links in a chain-belt. Various types of pivot means have been utilized for the joining and articulation of chain links, such as cylindrical pivot pins, pin and rocker, etc. wherein the chain links are provided in sets that are interleaved together and have aligned apertures in the links that receive the pivot means. The chain links articulate as the chain wraps around a pulley or sprocket for the chain.

Chain links which are used for the manufacture of chain-belts, combining a chain and a plurality of load blocks, are especially suitable to provide a driving connection between a pair of pulleys, resulting in a variable ratio drive transmission. The load blocks are positioned on the chain between the spaced pivot means and have one or more windows therein receiving the chain links extending therethrough. The load blocks have tapered outer or end surfaces which engage the sheave faces of the pulleys to provide the driving engagement between the pulleys and the chain-belt.

For a single round pin as the pivot means, the ends of the pins could be headed or swaged beyond the outside or guide chain links at both ends of the pin or the guide links could have slightly smaller apertures to provide a force fit with the ends of the pin. In some forms of power transmission chain using a pair of similar pins or a pin and rocker, one of the pin members is longer than the other, and the shorter member is retained in position by guide links flanking the edges of the chain; the guide link having apertures only large enough to receive the longer of the pin members. Then the longer of the pins is press-fit or otherwise secured in the guide link aperture.

Another method of limiting lateral movement of the pins or pin and rocker pivot means is through the use of a locking clip or spring clip. For a locking clip, the ends of the pins or pin and rocker have grooves located slightly beyond the chain links, and a clip engages in the groove or grooves to retain the pins intact. Such a locking clip is shown in U.S. Pat. No. 3,939,721. Where a spring clip is used, a resilient retaining clip extends across the width of the chain with downturned ends that extend over the ends of the pins or pin and rocker and are bent inward below the pin ends as seen in FIG. 9 of U.S. Pat. No. 4,507,106. One problem with either locking clips or spring clips is that clips are difficult to assemble and are prone to breakage, leaving the pins free to move laterally in the link sets. The present invention overcomes the problems relative to retaining the pivot pins in a chain-belt without adding any additional structure thereto.

SUMMARY OF THE INVENTION

The present invention relates to a chain-belt comprising interleaved sets of a plurality of chain links having spaced apertures wherein the apertures of adjacent sets of links are laterally aligned to receive the pins of a joint for articulation of the chain. A small longitudinally extending camber is introduced into at least one of the pins which, when assembled, creates a spring load between the pins and links, which load is sufficient to retain the pins in their operative position during assembly and handling of the chain-belt. The use of the camber for the pins obviates the need for locking clips and a press fit between the pins and guide link is not necessary.

The present invention also relates to a chain-belt consisting of interleaved sets of chain links having spaced apertures for pivot means, wherein each link has a pair of oppositely disposed tabs adjacent one end of each link; the links in a lateral set having the tabs at alternating ends. Also, the spaced apertures in each link have a generally hour-glass shape with the pins received in the rounded ends of the apertures and the narrowed central portion located between the pins. The load blocks encircling the sets of links are located between adjacent tabs on the interleaved links; the tabs preventing undue rocking action by the load blocks and thus decreased wear on the edges of the links.

Another feature of the invention is the use of two reduced-width links in the outermost positions of a set of interleaved links, to save metal without sacrificing any torque-carrying capacity of the chain-belt.

Further objects are to provide a construction of maximum simplicity, efficiency, economy and ease of assembly, and such further objects, advantages and capabilities as will later more fully appear and are inherently possessed thereby.

DESCRIPTION OF THE DRAWINGS

FIG. 4 is a cross sectional view of the chain-belt taken on the line 4—4 of FIG. 2.

FIG. 5 is an enlarged partial side elevational view with portions removed to show details of the chain links and rocker joint.

FIG. 6 is a horizontal cross sectional view through a portion of the chain-belt taken on line 6—6 of FIG. 5.

FIG. 7 is an enlarged perspective view of the cambered pins removed from the chain-belt.

DESCRIPTION OF THE PREFERRED EMBODIMENT

Figure 1:
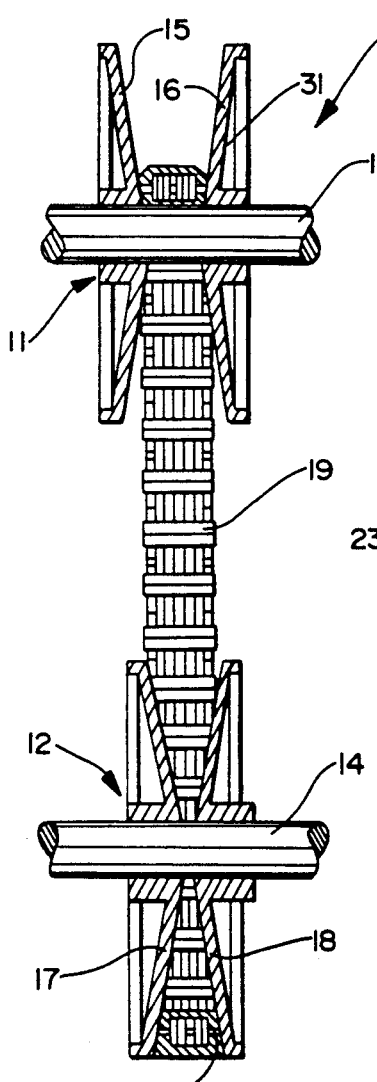
FIG. 1 is a cross sectional illustration of a variable ratio pulley transmission showing one speed ratio position, the pulleys being joined by a chain-belt embodying the present invention.
Figure 2:
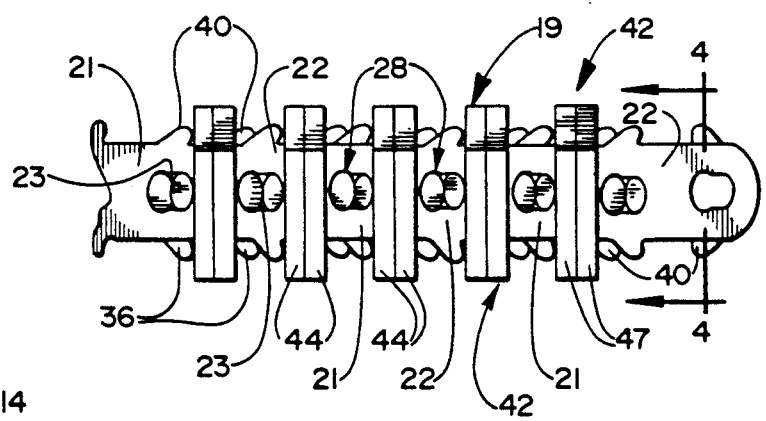
FIG. 2 is a side elevational view of a portion of the chain-belt connecting the pulleys in FIG. 1 and incorporating the rocker joint of the present invention.

Referring more particularly to the disclosure in the drawings wherein is shown an illustrative embodiment of the present invention, FIG. 1 discloses a variable pulley transmission 10 comprising a pair of pulleys 11,12 mounted on shafts 13,14, respectively. Each pulley includes a pair of flanges 15,16 or 17,18 drivingly connected by a chain-belt 19. One of the shafts is a driving shaft and the other is a driven shaft, and at least one flange of each pulley is movable axially relative to the opposite flange of the pair to vary the spacing between the flanges and thus vary the drive ratio of the transmission.

FIGS. 2 through 6 illustrate the power transmission chain-belt 19 of FIG. 1 which is constructed of sets of links 21 that are interleaved with adjacent sets of links 22; each link 21 or 22 having a pair of spaced apertures 23,23. Each aperture 23 consists of a generally hourglass shape having a pair of generally oppositely disposed rounded surfaces 24 and 25 separated by inward projections 26 forming a narrowed neck 27. The longitudinal axis of each aperture is rotated through approximately 4° from horizontal. The apertures in adjacent sets 21 and 22 of interleaved links are transversely aligned to receive pins forming an articulation or rocker joint 28 joining the adjacent sets of links and providing articulation therebetween. A rocker joint 28 comprises a pair of metal, generally D-shaped (in cross section) members or pins 29,31, each having a facing rocking surface 32 in contact with one another, and a pair of substantially semi-circular back surfaces 33, 34 respectively, which are generally conformably received in the link apertures 23. The rounded back surface 33 of pin 29 engages the surface 25 while the surface 34 of pin 31 is spaced from surface 24 of link 22 as seen in FIG. 5, and the rocking surfaces 32 contact at the aperture neck 27 so that the members can rock on each other. Likewise, surface 34 of pin 31 engages surface 25 of the aperture 23 in link 21, axially aligned with the above aperture of link 22, while surface 33 of pin 29 is spaced from the surface 24. This arrangement will be repeated in adjacent openings of links 21,22 with the chain in tension.

Each link 21 or 22 is provided with a pair of oppositely disposed tabs or ears 36,40 adjacent one rounded end 35 of the link and generally laterally aligned with the aperture 23 adjacent that end of the link. An inwardly curved lower surface 37 leads from the link end 35 to the lower tab 36 to terminate in a rounded end surface having a rearwardly facing flat surface 38 adapted to abut the side surface 43 of a load block 42. The tab is further provided with a rounded undercut surface 39 so arranged as to prevent interference with the assembly and operation of the load blocks thereon. An angularly inclined upper surface 41 extends from end 35 to upper tab 40, also terminating in a rounded end surface with a flat rear surface 38 and undercut corner 39.

Metal drive or load blocks 42 encompass the chain-belt 19 between adjacent rocker joints 28, each load block consisting of a one-piece member or constructed of a plurality of substantially identical block parts 44. Each load block 42 is of a generally trapezoidal shape, when viewed from the front, and may have a central "window" or opening to accommodate the sets of links, or two or three windows. In the illustrated embodiment block 42 includes a pair of windows 45 separated by a central strut 46 (FIG. 4) for receiving the chain-belt 19. Also, each block has oppositely disposed edges 47,47, which can be crowned or straight, acting to frictionally contact the correspondingly tapered flanges 15,16 and 17,18 of the pulleys, such as shown in FIG. 1.

Figure 3:
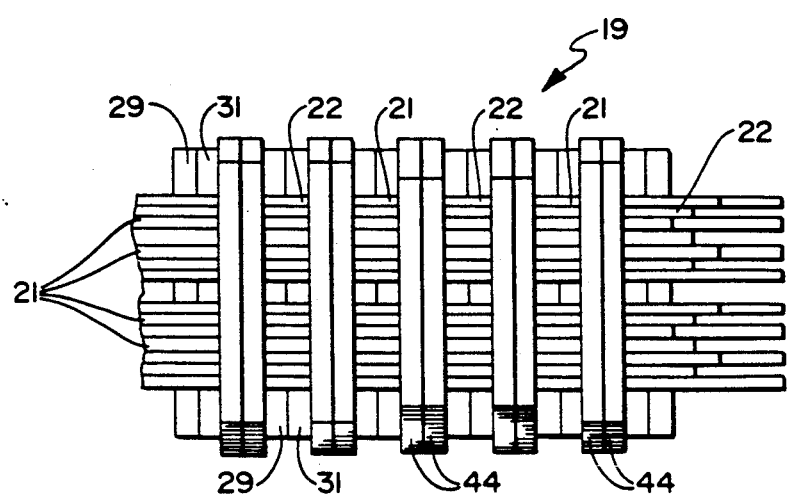
FIG. 3 is a top plan view of a portion of the chain-belt of FIG. 2.

FIGS. 4 through 6 more clearly disclose the links 21 and 22 of the chain-belt 19 and the rocker joints 28 extending through the apertures 23 of the interleaved links and projecting beyond the outermost links as seen in FIGS. 3, 4 and 6. One or both of the D-shaped pins 29 and 31 are slightly cambered, as at 48, along the longitudinal axis of the pin, the camber being exaggerated in FIGS. 6 and 7. If both pins are cambered, they are cambered in opposite directions. The cambered pins press against the rounded surfaces 25 of the link apertures 23 in alternating links 21 and 22 and are, therefore, self-retaining. Due to the camber, the outer ends 49 of the pins 29,31 bear against each other at the rocking surfaces 32. This load resulting from the camber is sufficient to retain the pins in operative position during handling and assembly. In operation of the transmission, the chain tension acts to flatten out the pins against each other and provide full rocking face contact.

Although the cambering of the pins eliminates the use of spring or locking clips to retain the pins in position in handling of the chain-belt, the pins may shift laterally during belt operation so as to contact the pulley flange faces. To reduce any damage to the pulley flanges, the ends 49 of the pins may be rounded or radiused. That the pins contacted the pulley faces was evidenced by slight wear on the flange surfaces and/or polishing of the ends of the pins. Also, the tabs 35 and 40 on the links 21 and 22 prevent tipping or rocking of the load blocks 42 on the chain, especially during articulation. Also, the curved surfaces 37 of tabs 36 allow the load blocks and links to rotate and articulate as the chain is wrapped around a pulley. With substantial elimination of rocking of the load blocks, wear on the upper and lower edges 51 of the links is substantially reduced, resulting in a much longer life for the chain. The undercuts 39 on the tabs obviates any interference of the corners of the load blocks with the links for ease of assembly on the chain.

Another aspect of the invention is the use of ranks or sets of links in which the outermost two links in each set of links is different, that is, have a width substantially less than the width of the other links in the same set or rank FIG. 6 shows that the outermost links of the ranks 21 are approximately one-half the width of the interior links. Because the outside links carry less load than the remaining inside links 21, it is possible to decrease the width and thus save the amount of metal for a chain, without diminishing the torque-carrying capacity of the total chain-belt.

I claim:

1. A link for a power transmission chain comprising an elongated body having a pair of longitudinally spaced apertures adjacent the opposite ends thereof, each aperture having a generally hour-glass shape with enlarged rounded ends joined by an intermediate neck portion,
    an angularly inclined upper surface extending from a first end and terminating in a first outwardly extending tab adjacent said first end of the link and generally laterally aligned with the aperture at said first end,
    an inwardly curved lower surface extending from said first end and terminating in a second outwardly extending tab adjacent said first end of the link and generally laterally aligned with the aperture at said first end, said first and second tabs being oppositely disposed,
    each tab having a rounded end surface, a flattened rear surface and an undercut corner substantially aligned with an edge of said first aperture.

2. The link for a power transmission chain of claim 1, wherein said chain is formed of a plurality of interleaved sets of said links, the links of a first set being operatively positioned with both said first and second tabs alternating on said first end and said second end of the links, and the links of an adjacent interleaved set also being operatively positioned with both said first and second tabs alternating on said first end and said second end of the links so that some tabs of said adjacent links overlap while other tabs of said adjacent links are spaced apart.

3. The link for a power transmission chain of claim 1, wherein said chain includes a load block operatively disposed about said first set of links between said apertures, said load block contacting the flat rear surfaces of said first and second link tabs.

* * * * *